United States Patent [19]

Troy

[11] Patent Number: 4,541,456
[45] Date of Patent: Sep. 17, 1985

[54] VALVE ASSEMBLY FOR PURGING PARTICULATES FROM A STEAM PIPING SYSTEM

[75] Inventor: Michael Troy, Westmont, Ill.

[73] Assignee: Engineering Resources, Inc., Chicago, Ill.

[21] Appl. No.: 577,688

[22] Filed: Feb. 7, 1984

[51] Int. Cl.⁴ .............................................. F16K 1/02
[52] U.S. Cl. .................................. 137/549; 137/886; 251/346; 251/351
[58] Field of Search ............... 137/544, 546, 549, 861, 137/886, 887; 251/339, 346, 351

[56] References Cited

U.S. PATENT DOCUMENTS

| | | | |
|---|---|---|---|
| 641,179 | 1/1900 | Ball | 137/549 |
| 675,711 | 6/1901 | Brophy | 137/549 |
| 909,061 | 1/1909 | Chew | 251/351 |
| 1,438,963 | 12/1922 | Collin | 137/549 |
| 3,460,804 | 8/1969 | Bulon | 251/346 |
| 3,893,473 | 7/1975 | Breece | 137/549 |

*Primary Examiner*—A. Michael Chambers
*Attorney, Agent, or Firm*—Silverman, Cass & Singer, Ltd.

[57] ABSTRACT

A valve assembly mountable in a debris strainer device installed in a steam piping system. The valve assembly includes a retractile valve stem cooperating with a conduit branch of the strainer device to form a short clearance chamber which restricts the amount of fluid which can collect in the chamber when the valve is closed. The valve stem is retractable initially to allow for substantially constant bleeding of discharge effluent prior to full retraction of the valve stem to fully open the valve for achieving "blow-off" or the blast of particulate discharge through the valve.

23 Claims, 6 Drawing Figures

U.S. Patent  Sep. 17, 1985  4,541,456
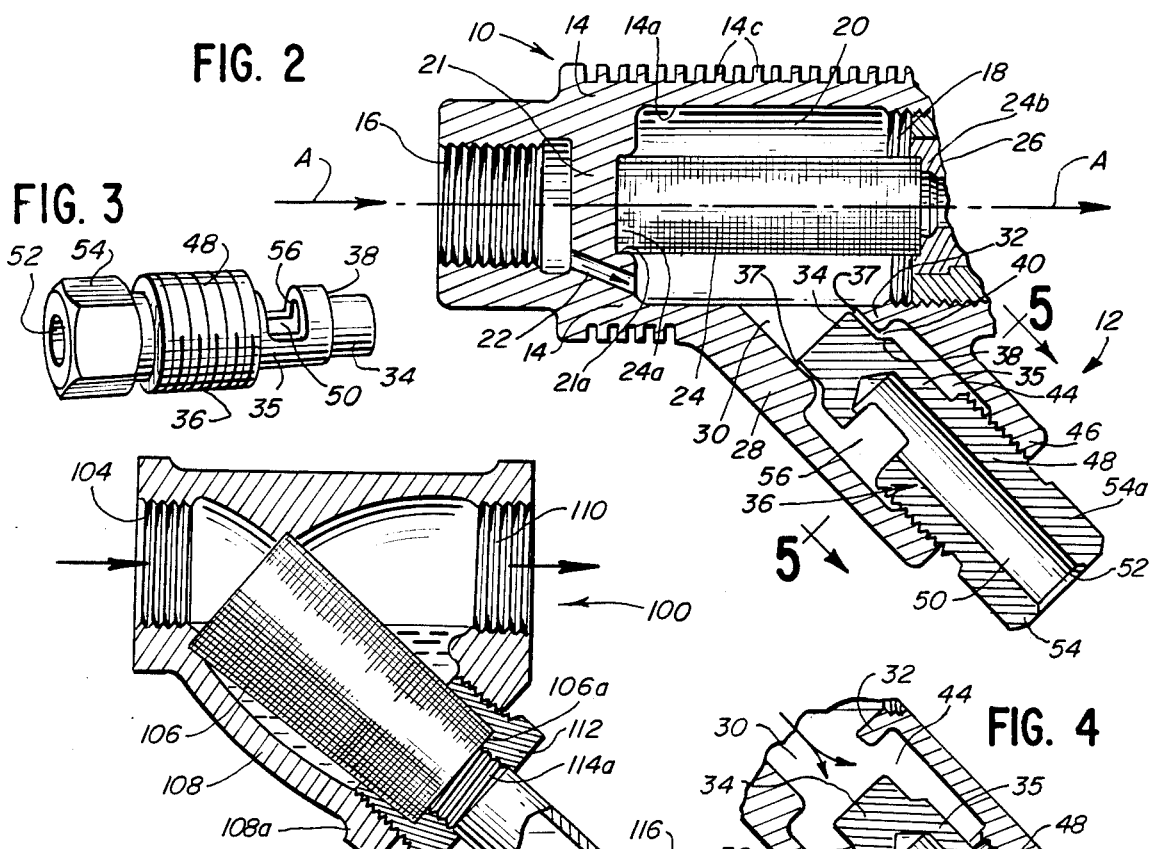
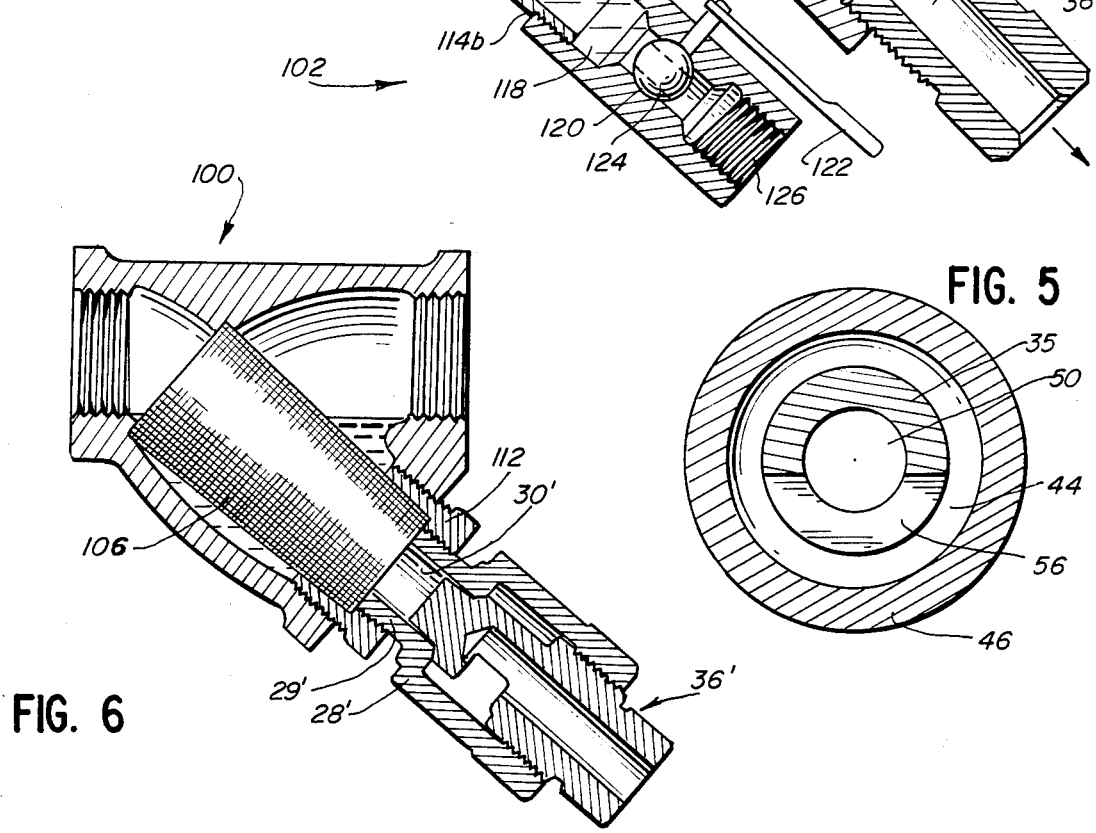

VALVE ASSEMBLY FOR PURGING PARTICULATES FROM A STEAM PIPING SYSTEM

CROSS REFERENCE TO RELATED APPLICATION

This application is related in subject matter to the concurrently filed and co-pending application of Michael Troy, titled MULTIPLE STAGE DEVICE FOR CONDENSATE REMOVAL FROM A STEAM PIPING SYSTEM, Ser. No. 577,687, filed 2/7/84 owned by the same assignee and incorporated herein by reference.

BACKGROUND OF THE INVENTION

This invention relates to a device for removing condensate from steam lines, and more particularly, relates to valves for purging particulate or other debris from the pipe lines or conduits through which live steam is conducted.

In steam piping systems, the condensate which accumulates is drained from the steam lines and generally returned to the steam boiler through condensate-return lines. The condensate-return lines usually include a debris strainer device which filters particulate debris, such as calcium carbonate, copper and oxides of copper particles, from the mixture of steam and condensate which flows through the strainer device into a so-called "steam trap" device. Typically, steam-traps, such as the familiar inverted, bucket traps, have been replaced with so-called orifice devices, typified in U.S. Pat. No. 4,426,213; in such orifice devices, the condensate obstructs the passage of steam through the orifice in order to minimize steam loss while permitting drainage of the condensate.

The conventional strainer device includes a filter screen which filters out the larger particulates from the condensate and steam mixture but permits passage of the mixture with smaller particulates. The particulates must be removed periodically in order to prevent plugging of the strainer device. To facilitate removal of the filtered particulates in an operation referred to as steam "blow-off", the strainer device is provided with an opening or port through which the blow-off is expelled. The blow-off opening normally is closed by either a simple, removable plug, such as described in U.S. Pat. No. 4,171,209, or with a blow-off valve which provides greater convenience in the blow-off operation. Usually, blow-off is performed when the strainer device is under full steam pressure so that the pressurized steam and condensate mixture dislodges the accumulated particles from the strainer and screen during the discharge.

The typical blow-off valve is a quick-acting device, for example, a ball valve, gate valve, or glove valve, through which the sudden, blow-off discharge creates a danger of burning the operator who opens the blow-off valve. Another disadvantage of the conventional blow-off valve is its susceptibility to rupturing due to freezing of unduly large columns of collected condensate in the strainer housing or valve housing. In many outdoor installations, a periodic shut down of steam operation in cold weather will permit the accumulation of such unduly large amounts of condensate in the strainer and valve to freeze when effort has not been made to manually drain the blow-off valve.

When the strainer is provided with a simple, removable plug, the danger of such a burn requires that the strainer be isolated from the steam system by closing valves both upstream and downstream in order to allow the strainer to cool down, thereby allowing the trapped steam to condense before it is safe to remove the plug. Thus, only after the plug is removed, can the upstream valve be opened to allow the blow-off discharge; and the upstream valve must once again be closed to allow reinstallation of the plug. Subsequent, normal operation requires the shut-off valves to be opened again. This cumbersome procedure has resulted in the alternative provision of blow-off valves in many strainer installations with the consequent danger of sudden blow-off discharge.

BRIEF DESCRIPTION OF THE DRAWING

FIG. 1 is a view of a median section through a prior art strainer device and valve assembly;

FIG. 2 is a median sectional view taken through a strainer device and the valve assembly embodying the invention;

FIG. 3 is a perspective view of the valve stem of the valve assembly illustrated in FIG. 2;

FIG. 4 is a fragmentary median sectional view taken through the valve assembly of FIG. 2 and illustrating the fully open position of the valve stem;

FIG. 5 is a sectional view taken along the line 5—5 in FIG. 2, and in the indicated direction; and FIG. 6 is a median sectional view taken through a prior art strainer device having a modified embodiment of the valve assembly embodying the invention installed therewith.

SUMMARY OF THE INVENTION

According to this invention, a blow-off valve is structured to enable the blow-off operation to be initiated by a constant volume bleeding-type discharge before the valve is fully opened to expel the dangerously hot blast of particulate discharge. In addition, the valve is constructed to prevent inadvertent rupture under freezing temperature conditions by limiting the quantity of fluid accumulation in the valve assembly after the valve is closed.

The valve assembly includes a housing in which a valve stem is longitudinally movable to open and close the valve. The housing has a short entrance channel into which one end of the valve stem is received when the valve is closed. The short entrance channel upstream of the valve stem prevents accumulation of a large column of condensate within the valve housing. When the valve is closed, the stem has a short, uniform diameter projecting end section which engages a valve seat formed as part of the short entrance channel to close the valve in the housing. Initial opening of the valve slowly disengages the uniform end section from the valve seat, but initial discharge is limited by permitting passage thereof only through a small clearance space between the projecting end section of the stem and the valve seat. Only after the stem is retracted sufficiently to space said projecting end portion completely from the valve seat, is a full blast of blow-off discharge expelled through the outlet of the valve.

The blow-off valve can be provided with a housing which is integral with the particulate strainer device, or the housing can be constructed to permit the valve to be installed into a separate strainer device, for example, a conventional Y-strainer.

DETAILED DESCRIPTION OF THE INVENTION

A. Prior Art Description

FIG. 1 illustrates a conventional Y-strainer 100 and fast acting blow-off valve 102 normally intended to be installed in a steam conduit system which is not shown. With the blow-off valve 102 closed, the steam and condensate enter the strainer inlet 104, and pass through the cylindrical, wire mesh screen 106 which is mounted in the angular branch 108 of the strainer. The steam and condensate pass from the interior to the exterior of the screen 106 and exit from the outlet 110 in the direction indicated by arrows. The filtered particulates are retained on the interior of the screen 106.

The outlet end 106a of screen 106 through which blow-off is discharged, is mounted in a cylindrical adapter 112 which is threadedly engaged in the threaded outlet 108a of the angular branch 108. The adapter 112 is internally threaded to receive one end 114a of a short, nipple pipe 114 which is threaded at the other end 114b to the inlet of the blow-off valve housing 116. Typically, the throat 118 within the housing 116 is opened and closed by the quick action of the ball valve 120. The manual action required to open the valve by turning the handle 122 commonly results in a rapidly increasing and dangerous blow-off discharge produced by sudden alignment of the cylindrical hole 124 in the valve 120 with the throat 118 and outlet 126. In other words, it is difficult to prevent increasingly incremental bleeding by means of such prior art valves.

The strainer 100 is seen to be mounted horizontally as required by the horizontal inlet and outlet orientation of most steam traps. If the shut down of steam flow to the strainer device 100 occurs under freezing conditions, the resulting accumulation of a long column of condensate within the obviously elongated throat 118, extending through the nipple 114 and into the angular branch 108, will often produce freezing of the condensate with attendant rupture of the valve 102. Even if strainer 100 is mounted vertically, the same susceptibility to rupturing due to freezing of accumulated condensate in the throat 118 will exist without the inconvenient effort of deliberate manual draining of the valve 102.

B. Embodiments of the Invention

Referring to FIG. 2, an embodiment of an assembly including a strainer device and blow-off valve according to this invention is illustrated, said strainer device and valve being generally designated by respective reference characters 10 and 12. Of course, the assembly is intended to be installed in a steam piping system which is not shown. A mixture of condensate liquid and steam under pressure flows through the strainer device from left to right in the direction of the arrows A. The strainer 10 includes a generally cylindrical body 14 fabricated from suitable metal or alloy, such as steel or brass, and has an internally threaded inlet 16 and an outlet 18. Outlet 18 can be threaded for receiving either a section of condensate return line (not shown) or a drain orifice device as more particularly described in the related application referred to hereinabove.

The strainer body 14 houses a generally cylindrical chamber or dirt pocket 20, defined at one end thereof by traverse wall 21, in which large particulates will accumulate as a build-up on the interior surface of wall 14a of body 14. The mixture of steam and condensate flows from the inlet 16 to the body 14 by way of a short passageway 22, having a very small diameter, through the wall 21 and into the chamber 20. A wire-mesh cylindrical screen 24 is mounted within chamber 20 at end 24a thereof upon an annular shoulder 21a in the wall 21.

The mixture of condensate and steam flowing through small diameter passageway 22 expands into chamber 20 because the cross-sectional area of the chamber 20 compared to that of the passageway 22 is in the approximate range of 100:1. This relationship results in some condensation of the steam within the chamber 20. Fins 14c are provided to promote the condensation by cooling of the body 14. The mixture of condensate and remaining steam flows from the chamber 20 into the interior of screen 24 so that entrained debris and particulates are retained by the screen 24. The condensate and steam continue to exit through an annular adapter 26, positioned within the outlet 18, on which the opposite end 24b of the screen 24 is supported.

As illustrated in FIG. 2, a generally cylindrical housing 28 is formed integral with the strainer body 14, said housing 28 having the blow-off valve 12 installed therein. Housing 28 projects at an acute angle from the body 14. Alternatively, the housing 28 can project generally perpendicular to the axis of body 14, as illustrated in the related pending patent application identified herein. An axial channel 30 is formed through the housing 28 to provide a purposefully short passageway from the chamber 20. The channel 30 terminates within the housing 28 at an annular valve seat 32. When the valve 12 is closed, a valve head having a front end portion 34 of a movable valve stem 36 extends beyond the seat 32 into the channel 30 to occupy a portion of the channel 30. The valve seat 32 can have an internal diameter of, for example, approximately 0.422 inch and the end portion 34 can have a uniform diameter of approximately 0.406 inch to form an annular clearance space 37 therebetween having a width of approximately 0.008 inch. The closure seal of the valve 12 is produced by engagement of the seat 32 with an annular shoulder 38 formed on the stem 36 between the end portion 34 and a barrel portion 35 of larger diameter, for example, 0.56 inch. As illustrated in FIG. 2, the valve 12 initially is opened to form an annular clearance space 40 between the seat 32 and shoulder 38; clearance space 40 is continuous with the annular clearance space 37 between the seat 32 and end portion 34 of the stem 36. This uniform clearance between the valve seat and end portion of the stem assures even, constant bleeding before full opening of the valve.

The housing 28 includes a generally cylindrical cavity or throat 44 having a diameter of, for example, 0.8 inch, formed between the seat 32 and an internally threaded end 46 of housing 28. A central portion 48 of the stem 36 is externally threaded into the threaded end 46. The stem 36 has a generally coaxial duct 50 which opens through an aperture 52 formed in the end 54 of stem 36. The exterior surface of the end 54 is provided with hexagonally configured flat seats 54a to enable manual turning of the stem by a wrench.

As illustrated in FIGS. 2 and 3, a semi-circular shaped notch 56 is formed through the barrel portion 35 of stem 36 and opens into the duct 50 to provide fluid communication between the duct 50 and the housing throat 44 as further illustrated in FIG. 5.

The valve 12 is normally closed by the engagement of shoulder 38 with the seat 32, so that the projection of end portion 34 into channel 30 prevents a long column of condensate from accumulating in channel 30 to prevent rupture of the housing should the steam supplied to the strainer be shut off during cold weather.

When the blow-off operation is to be performed, the end 54 is slowly turned to retract the stem 36 and the shoulder 38 from the seat 32 to create the clearance space 40 opening the valve 12. However, the initial few turns only permit constant, slow bleeding. Under the full force of the steam pressure when the valve is fully open, the condensate and steam mixture dislodge the particulates from the pocket 20; this blow-off discharge is forced through the clearance spaces 37 and 40 into the throat 44 and then through the notch 56 into the duct 50 from which the discharge is expelled through the aperture 52. Even though the first few turns of the stem create the clearance space 40, the initial passage of the discharge through the valve 12 is limited by the small annular clearance space 37. The clearance space 37 remains constant as the length of the end portion 34, for example approximately 0.2 inch, passes through the valve seat 32 during the initial turns to retract the stem 36. The resulting initial discharge is a slow, constant bleeding action indicated by a limited escape of steam which alerts the operator that the seal of the valve has been broken. This initial discharge is so slow and small that even accidental contact with the operator's skin will not cause a burn. Thereafter, continued turning of the stem 36 will retract the end portion 34 from the channel 30 and entirely through the seat 32, enabling passage of the discharge through the center of the seat 32 as illustrated in FIG. 4. The resulting increase in the volume of discharge provides complete dislodgement or blow-off of the particulates from the pocket 20 when the operator is prepared for a brief blast of the discharge from the aperture 54. After the discharge in the blow-off operation is completed, the valve 12 is closed for resumption of normal operation to force the steam and condensate mixture through the filter 24 and outlet 18.

Referring to FIG. 6, an embodiment of the valve according to this invention, generally designated by reference character 12', is shown in assembly with the conventional Y-strainer 100 having the same parts illustrated in FIG. 1. Valve 12' has been modified only for insertion into the conventional Y-strainer by providing an external, threaded portion 29' on housing 28' for threaded insertion into the adapter 112 so that the channel 30' provides fluid communication for blow-off discharge through the interior of screen 106. The valve housing can be similarly modified for insertion into strainer devices having various configurations.

Variations in the size and structural features of cooperating parts and in materials used may occur to the skilled artisan without departing from the crux of the invention, the scope of which is set forth in the claims hereto appended.

I claim:

1. A valve assembly adapted to be operatively associated with a strainer device for purging condensate and particulate debris from live steam lines comprising:
A. a housing including a channel having a fluid entrance thereinto, said channel terminating at an annular valve seat positioned between said channel and a cavity in said housing downstream of the channel; and
B. an elongated valve stem mounted in said housing for selective axial movement to open and close communication between said channel and cavity through said valve seat, said stem including:
  1. a valve head having a projecting end portion extending through said valve seat into said channel and dimensioned to form an annular clearance space between the valve seat and end portion in a closed position of the valve;
  2. said valve head further including an annular shoulder dimensioned to be engaged against the valve seat for closing the valve, said shoulder tapering between said end portion and an enlarged barrel portion of said stem disposed in said cavity,
  3. said stem having an axial conduit communicating at one end thereof with said cavity and at its opposite end with ambient atmosphere,
  4. said stem being retractable initially to withdraw the shoulder from the valve seat and the projecting end portion from the valve seat gradually so as to permit only bleeding of condensate and debris from the channel into the cavity through said clearance space while the end portion is in the valve seat, and thereafter, retractable to withdraw said projecting end portion completely from the valve seat so as to enable blow-off of the condensate and debris from the channel through said cavity and conduit of the stem for purging the steam lines.

2. The valve assembly claimed in claim 1 in which said projecting end portion is of substantially uniform cross-section along the length thereof.

3. The valve assembly claimed in claim 1 in which said projecting end portion is dimensioned to reduce the volume of space for accumulation of condensate in said channel when the valve is closed.

4. The valve assembly claimed in claim 2 in which said projecting end portion is of short length so as to maintain said clearance space during the initial retractile movement of the valve stem from the closed position of the valve.

5. The valve assembly of claim 1 in which said stem has an opening into said conduit transverse to the axis of the conduit and communicating with said cavity.

6. The valve assembly of claim 5 in which said communicating opening is of arcuate formation.

7. The valve assembly of claim 1 in which said stem is threadedly engaged in said housing for axial movement therein to open and close the valve.

8. The valve assembly of claim 1 in which said housing is integrally formed with said strainer device.

9. The valve assembly of claim 1 in which said housing is separably connected to the strainer device.

10. A combination strainer device and valve assembly for filtering and purging condensate and particulate debris from live steam lines comprising:
A. a strainer body having a fluid inlet and outlet and a chamber communicating between said inlet and outlet, and filter means in said chamber for filtering particulate debris from a mixture of steam and condensate flowing through said chamber between said inlet and outlet;
B. a housing connected to said body including a channel having a fluid entrance communicating with said chamber for purging debris accumulated by said filter means, said channel terminating at an annular valve seat positioned between said channel and a cavity in said housing downstream of the channel; and
C. an elongated valve stem mounted in said housing for selective axial movement to open and close communication between said channel and cavity through said valve seat, said stem including:
  1. a valve head having a projecting end portion extending through said valve seat into said channel and dimensioned to form an annular clearance space between the valve seat and end portion in a closed position of the valve;

2. said valve head further including an annular shoulder dimensioned to be engaged against the valve seat for closing the valve, said shoulder tapering between said end portion and an enlarged barrel portion of said stem disposed in said cavity, 3. said stem having an axial conduit communicating at one end thereof with said cavity and at its opposite end with ambient atmosphere, 4. said stem being retractable initially to withdraw the shoulder from the valve seat and the projecting end portion from the valve seat gradually so as to permit only bleeding of condensate and debris from the channel into the cavity through said clearance space while the end portion is in the valve seat, and thereafter, retractable to withdraw said projecting end portion completely from the valve seat so as to enable blow-off of the condensate and debris from the channel through said cavity and conduit of the stem for purging the steam lines.

11. The combination claimed in claim 10 wherein said fluid inlet and outlet are aligned in said body, said housing being integral with the body and extending angularly therefrom in relation to the alignment of said fluid inlet and outlet.

12. The combination claimed in claim 11 wherein said filter means comprises a cylindrical screen having its axis aligned at an angle in relation to said housing.

13. The combination claimed in claim 10 wherein said body includes an internal wall positioned between said inlet and said chamber, said wall having a passageway therethrough of smaller diameter than the internal diameter of said chamber.

14. The combination claimed in claim 13 wherein said passageway is positioned so that when said valve is closed, flow of said mixture into said chamber passes through said filter means into the interior thereof to said outlet.

15. The combination of claim 10 in which said housing is integral with said body.

16. The combination of claim 10 in which said housing is separable from said body.

17. The combination of claim 16 in which said housing has its axis normal to the longitudinal axis of the body.

18. The combination claimed in claim 10 in which said projecting end portion is of substantially uniform cross-section along the length thereof.

19. The combination claimed in claim 10 in which said projecting end portion is dimensioned to reduce the volume of space for accumulation of condensate in said channel when the valve is closed.

20. The combination claimed in claim 18 in which said projecting end portion is of short length so as to maintain said clearance space during the initial retractile movement of the valve stem from the closed position of the valve.

21. The combination of claim 10 in which said stem has an opening into said conduit transverse to the axis of the conduit and communicating with said cavity.

22. The combination of claim 21 in which said communicating opening is of arcuate formation.

23. The combination of claim 10 in which said stem is threadedly engaged in said housing for axial movement therein to open and close the valve.

* * * * *